March 22, 1966 E. C. LUNDAHL 3,241,696
APPARATUS FOR STACKING, LOADING AND UNLOADING
BULK OR BALE-LIKE OBJECTS
Filed Nov. 8, 1963 12 Sheets-Sheet 1

Fig. 1.

INVENTOR
Ezra C. Lundahl
BY
Stevens, Davis, Miller & Mosher
ATTORNEYS

March 22, 1966  E. C. LUNDAHL  3,241,696
APPARATUS FOR STACKING, LOADING AND UNLOADING
BULK OR BALE-LIKE OBJECTS
Filed Nov. 8, 1963  12 Sheets-Sheet 2

INVENTOR
Ezra C. Lundahl
BY Stevens, Davis, Miller & Mosher
ATTORNEYS

United States Patent Office 3,241,696
Patented Mar. 22, 1966

3,241,696
APPARATUS FOR STACKING, LOADING AND UN-
LOADING BULK OR BALE-LIKE OBJECTS
Ezra C. Lundahl, Logan, Utah, assignor to Ezra C. Lundahl, Inc., Logan, Utah, a corporation of Utah
Filed Nov. 8, 1963, Ser. No. 322,427
12 Claims. (Cl. 214—509)

This invention relates to an apparatus capable of stacking, loading and unloading bale-like objects, and more patricularly, banded bales of hay.

The invention includes a novel combination of a hay carrier or wagon having a conveyor or inclined elevator disposed adjacent one side thereof. The elevator can be rotated inwardly so as to be stored when not actually in use. The wagon also includes tandem wheel assemblies provided with hydraulic jacks attached thereto for moving the wheel assemblies from a horizontal to a vertical position for the purpose of adjusting the height of the wagon to different levels from the ground. The lower height is used when the wagon is being loaded or stacked while the raised level is used when automatically transferring a load of bales from the wagon to a flat bed truck.

The wagon is also provided with a jack located at the front end thereof so that the wagon bed can be tilted or inclined for easy loading or unloading of the stacks of bales. By operation of said jack the wagon frame and tail gate can also be used as a lever to break stacks of bales loose from the ground during winter weather.

A pusher or "false front" is also normally provided at the front end of the wagon and is movable by hydraulic jacks and a novel cable and pulley system disposed, for the most part, underneath the wagon frame. Said false front is normally vertically disposed but can be rotated to assume a horizontal or ramming position for the purpose of ramming to load onto a semi-trailer or railroad platform.

The wagon is also provided with a tailgate capable of being hydraulically rotated from a position in which it is in contact with the ground to a vertical position. When loading stacks of bales onto the wagon, the tailgate can be used to push the load even further onto the wagon for better load distribution.

Associated with the false front is a pair of elongated rods with a series of rings attached thereto. A set of corner plates and chains are used with said rods to effectively pull the load onto the wagon frame.

Thus it will be disclosed, a combination of eelments to provide a series of varied operations by which a wagon can be used to first gather individual bales of hay and load them on the wagon. Thereafter, the loaded wagon can be transported to a storage area and the entire load ejected in a neat and compact stack by the false front. After the entire field has been cleared of individual bales and stacked in the storage area, the wagon can be utilized to reload the wagon in stacked loads, transfer the load to railroad platforms or onto the bed of a semi-trailer truck for transportation to another location.

An object of this invention is the stacking of bale-like objects quickly, efficiently and expeditiously from strewn positions around a field to neatly arranged stacks on a wagon bed.

Another object is the efficient picking up of bale-like objects regardless of the relative position of the bale on the ground or the angle that the tractor approaches the bale.

Another object of the invention is the provision of a permanent storage position and a temporary storage position for the pick-up elevator when not in use.

Still another object of the invention is the provision of a hydraulic elevator drive system operable in either direction while said pick-up elevator is in an operating position or a semi-operating position.

Yet another object of the invention is the provision of a hydraulically operated tailgate and false front. Said false front being adapted to pivot downwards into a pushing or ramming position.

Another object of the invention is the provision of a novel cable, pulley, and hydraulic system to operate the false front.

Another object of the invention is the provision of hydraulic means to raise the front end of the trailer to afford easy loading conditions.

Another object of the invention is the provision of a novel wheel system mounted on the wagon which enables easy movement over mud or trenches.

Another object of the invention is the provision of a hydraulic jack associated with the wheel system to raise or lower the wagon level for the loading or unloading of stacks of hay from flat bed trucks or railroad loading platforms, said hydraulic jack being stored in an inoperative position when not in use.

Another object of the invention is the provision of special rods and chains associated with the movable false front for the purpose or urging the load onto the wagon bed.

It is a further object of the invention to provide for a special wheel system on the wagon to allow the wagon to be operated in a high or low position.

It is a further object of the invention to provide a novel wheel system on the wagon to allow the wheels of said wagon to be operatively mounted outside or inside the periphery of said wagon.

Another object of the invention is to provide a new method of loading a stack of bulk like objects onto a flatbed truck.

Other objects and features of the invention will become apparent with the following detailed description.

FIG. 1b is a partial sectional view taken along line 1b—1b of FIG. 1a.

FIG. 2 is a rear elevation of the vehicle;

FIG. 2b is a view taken along line 2b—2b of FIG. 2a;

Referring to the drawings in detail, there is shown a wagon of the type described including a substantially rectangular frame 1 having upright members 2 spaced longitudinally along the sides thereof. Secured to the rear most upright member 2 are upper transverse bar supports 3 and lower transverse bar supports 4. Located at the forward end of frame 1 is found false front 5, mounted on wheels 6 and adapted to move forward or rearwardly depending on the forces applied to said false front by said pulley and cable system better shown in FIGS. 6, 7 and 8. The respective ends of the false front 5 are clamped to the movable cables 112 and 113 by the clamping plates 8 and "U" bolts 7, and the center of false front 5 is similarly clamped to cable 108. Pivot brackets 9 are mounted on said false front directly above said clamping plates 8 and have associated therewith pulling rods 10 adapted with chain rings 11 and end ring 12. Front 5 is hinged to rotate about pivots 5b to a horizontal position to push or ram a load with angle plate 5a.

The wheel assemblies for supporting the sides of the wagon frame include a pair of triangular members 13, which are hollow structures comprising a number of steel plates welded or otherwise secured together to form a rigid unit. Said members 13 have holes 13a for receiving short transverse axles 14, said axles supporting the frame 1 by being fitted in collars 15 (FIG. 2). Said triangular members 13 are rotatably secured on said axles 14 by threaded caps 16. Holes 17 are also found in the triangular member 13 for the purpose of receiving wheel axles 18. A pair of wheels 19 are mounted on the rear wheel axle 18, and a pair of wheels 20 is mounted on the forward wheel axle 18. A single, center, outside wheel 22 is mounted on wheel axle 21 and said axle 21 is mounted on the triangular member 13.

Figure 1:
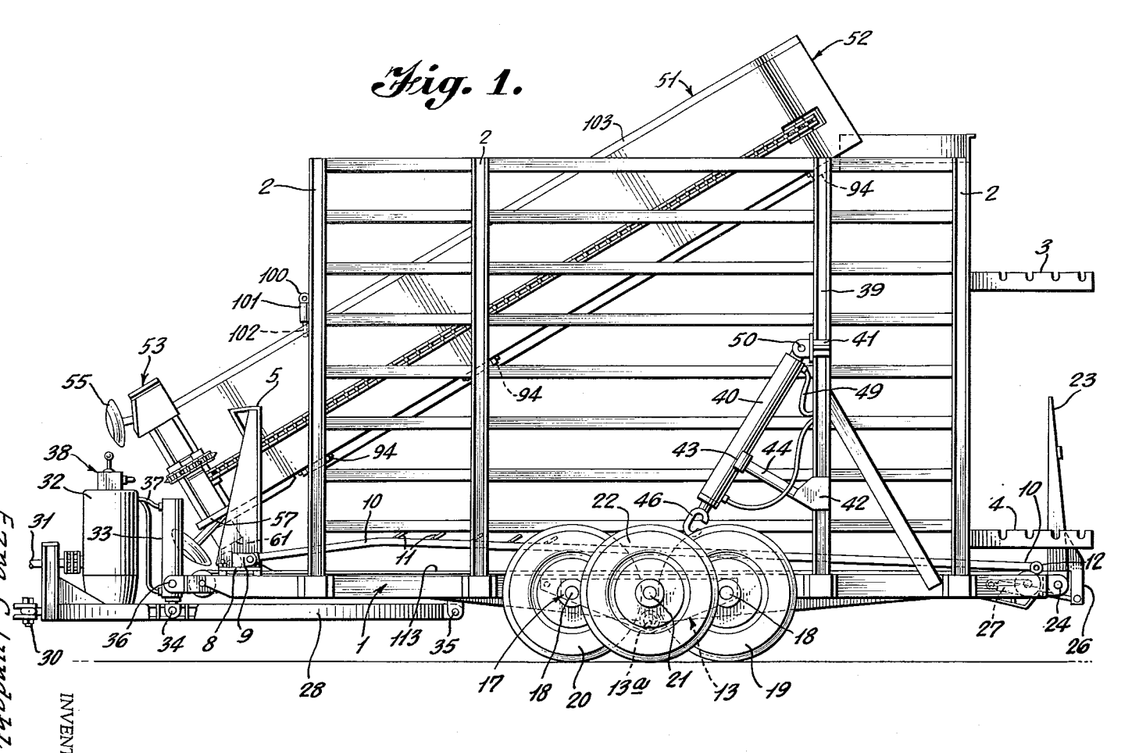
FIG. 1 is a side elevation of the entire stacking vehicle and pick-up elevator, said pick-up elevator is mounted in the final storage position.
Figure 1A:
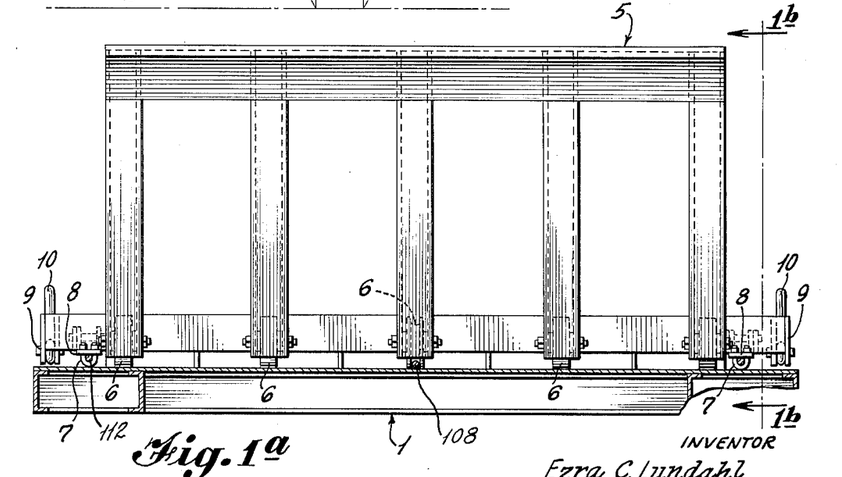
FIG. 1a is a front elevation of the false front on the wagon frame.
Figures 1B, 2B:
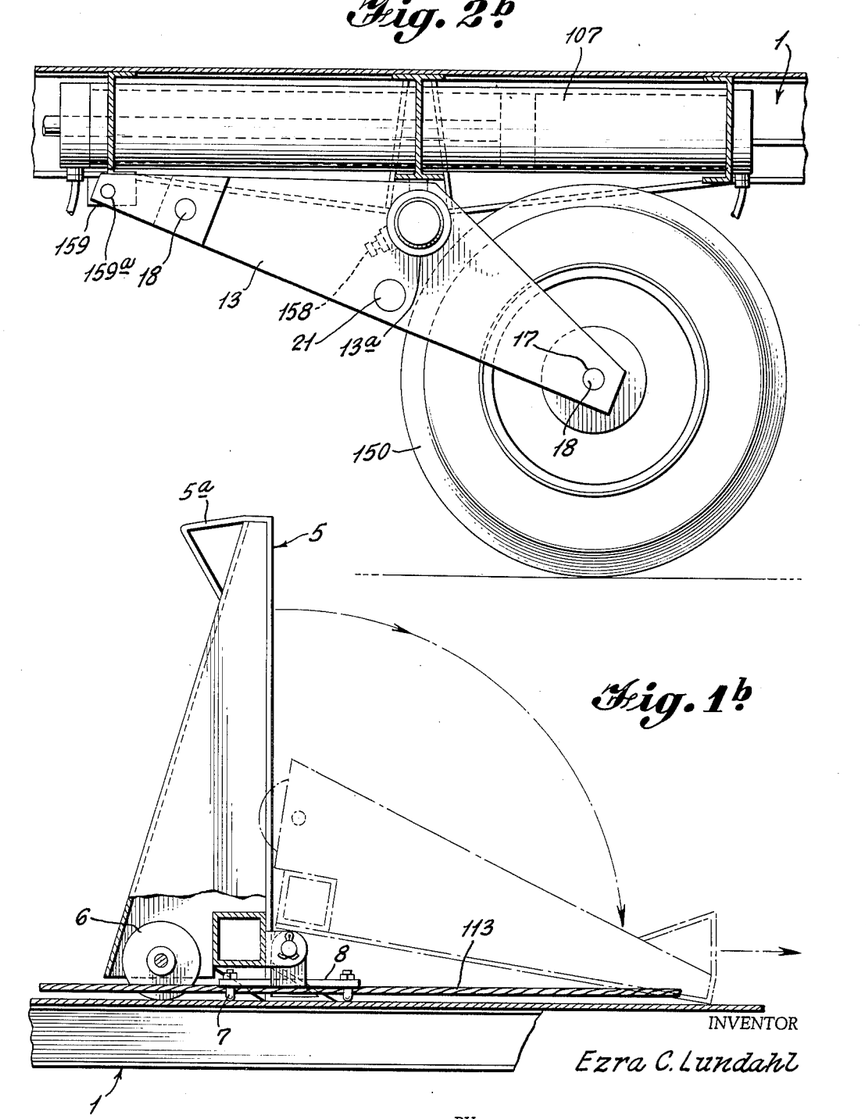
Figure 2A:
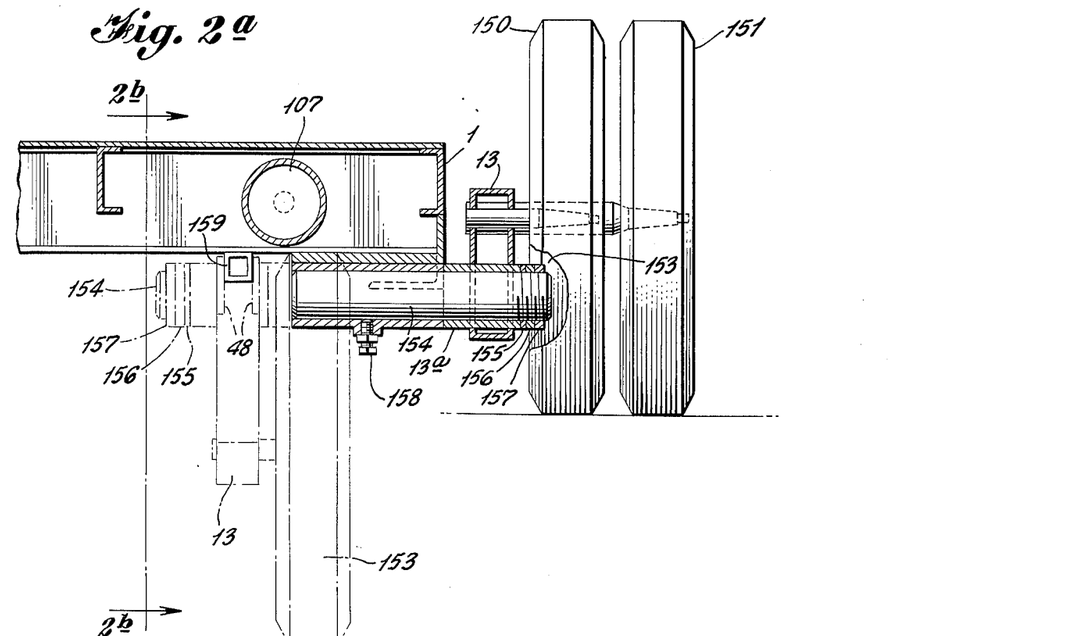
FIG. 2a is a rear sectional view of a modification of the wheel assembly.

A modification of the wheel assembly, which can be used interchangeably with the wheel assembly shown in FIG. 2, is shown in FIG. 2a and FIG. 2b. Triangular member 13 is shown supporting three wheels 150, 151 and another wheel 153 located directly behind wheel 150 in the FIG. 2a. Member 13 is rigidly mounted on tubular member 13a which is rotatably mounted on axle 154 and held thereon by washer 155, threaded collar 156 and threaded lock collar 157. The main axle is rigidly secured to frame 1 by set screw 158 threaded into tube member 159, which is integral with frame 1.

When it is intended that the wagon be used on the highway or for any other purpose in which a narrower wagon width is desired or necessary, wheels 153 and 151 are removed, set screw 158 loosened, and collars 156 and 157 removed. These elements are reassembled as shown in dotted lines in FIG. 2a and FIG. 2b. Members 13a is again mounted on axle 154 but now member 13 assumes a fixed angular position maintained by ears 48 being rigidly secured by socket 159 and pin 159a. Said socket is welded or integral with frame 1. With the wheel support in this position, the frame 1 of the wagon is raised to afford the proper clearance to wheel 150 and wheel 150 is located in such a lateral position so as to render effective lateral stability to the wagon.

Figure 6:
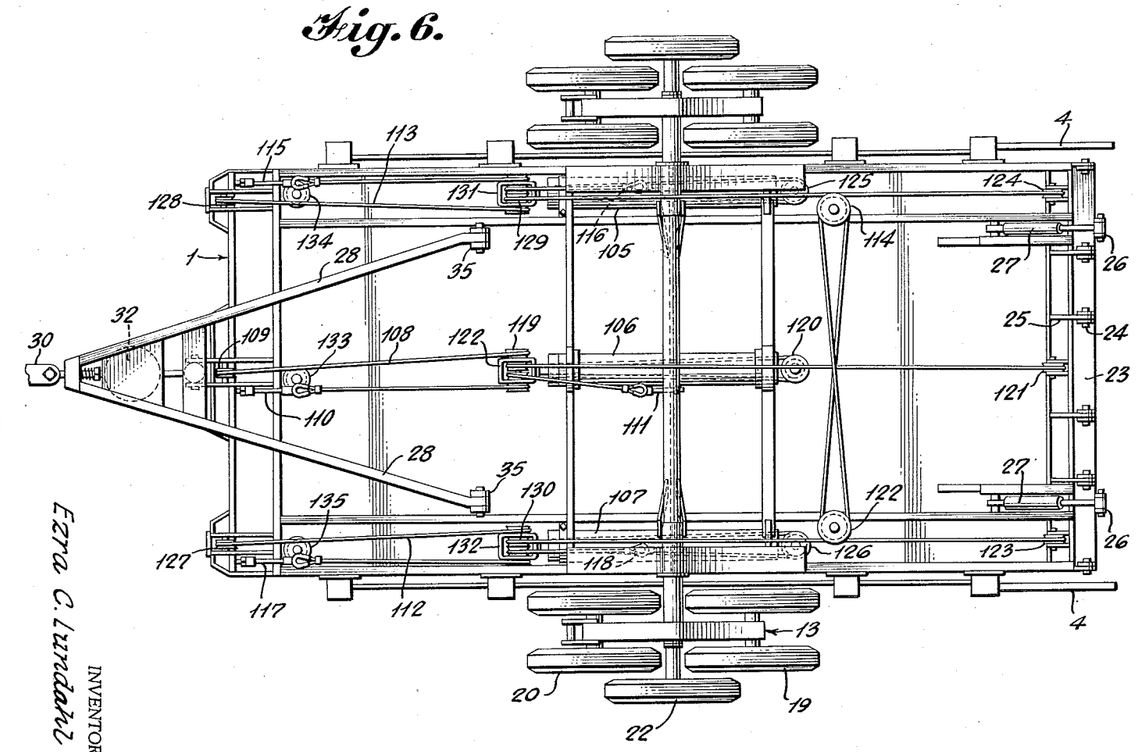
FIG. 6 is a view of the underside of the trailer bed.

The design and dimensions of the wheel assembly shown in FIG. 2a and FIG. 2b and the location of the pulley systems as shown in FIG. 6 are such that physical interference therebetween is avoided. When the wheel assembly is mounted on the outside of the wagon as shown in solid lines in FIG. 2a, it can be used in conjunction with the wheel jack 40 as will be described below.

Rotatably mounted at the rear end of frame 1 is found tailgate 23 rotatably secured by pins 24 and brackets 25. A connecting member 26 is welded, soldered, or otherwise secured to the lower end of tailgate 23. A hydraulically operated tailgate jack 27 is pivotally mounted on the underside of frame 1 and associates with the connecting member 26 to selectively apply a rotating force thereto. Note that the profile of tailgate 25 is wedged shaped for a purpose to be described later.

Rotatably secured to the underside of wagon frame 1 are located converging arms 28 secured at their front end by short cross member 29. Said cross member 29 supports any conventional hitching means 30 and also provides support for shaft 31 which is driven by power from any conventional tractor. Supported on converging arms 28 is the hydraulic pump system and reservoir 32 and a hydraulically operated front end jack 33. The pump system 32 is driven by the shaft 31. When the hydraulic jack 33 is operated, rotation is provided between the jack 33, the frame 1, and converging arms 28 by the pivots 34, 35 and 36. Hydraulic lines 37 connect the front end jack 33 to the hydraulic reservoir and pump system 32 so that said jack can be selectively operated by manipulations of valve levers 38. Valve levers 38 also selectively control the actuation of all other hydraulic jacks on the wagon as will be shown below.

Mounted on the upright member 39 by a lateral bracket 41 and angle bracket 42 is the wheel assembly jack 40. The jack 40 is supported in an inoperative position by cradle 43 and supporting arm 44. Located at the end of the extendable piston 45 is C hook 46, said C hook 46 is adapted to engage rod 47 mounted on the forward ends of triangular member 13 by connecting plates 48 (FIG. 6). Jack 40 is selectively actuated by the fluid force through line 49. Pivot 50 is provided for rotating jack 40 to an operative position.

Figure 3:
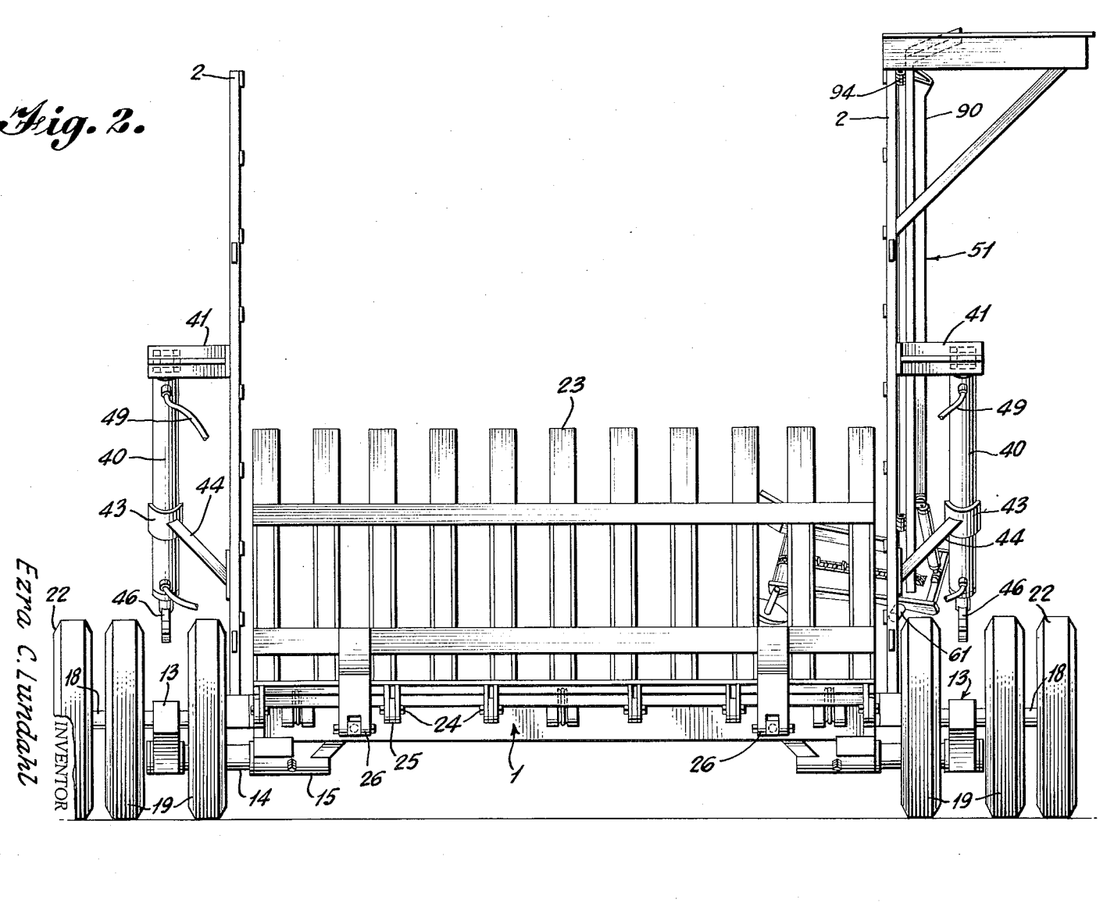
FIG. 3 is a detailed elevation view of the pick-up conveyor in its operating position.
Figure 4:
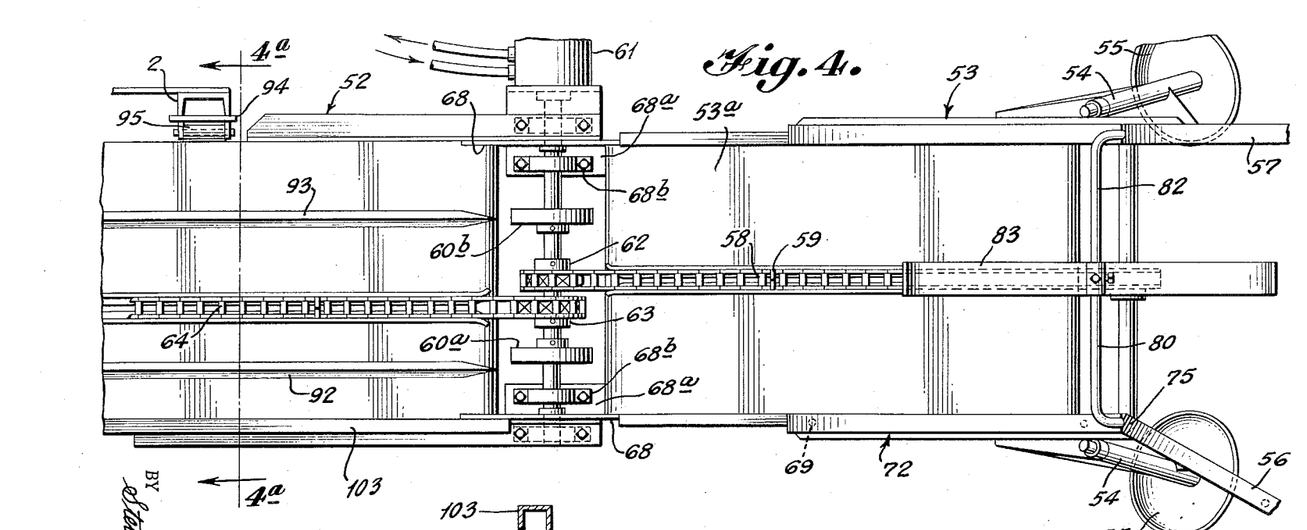
FIG. 4 is a plan view of FIG. 3.
Figure 4A:
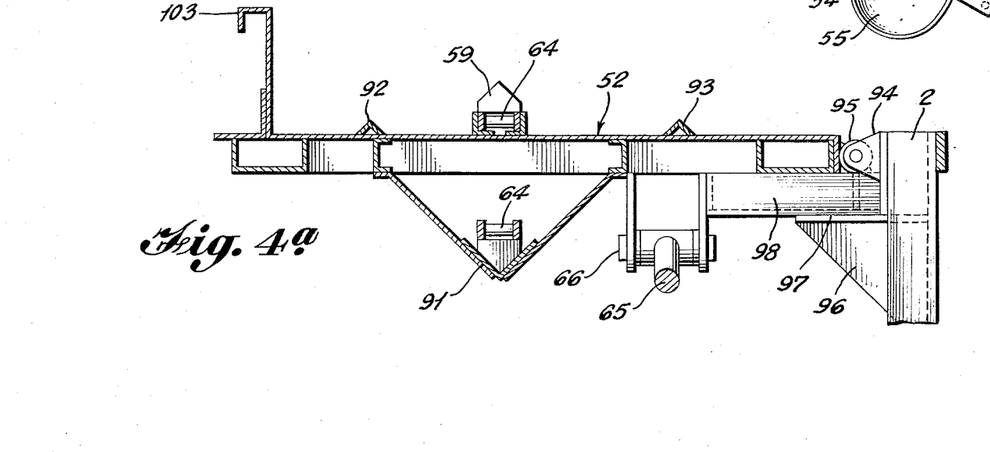
FIG. 4a is a view taken along line 4a—4a in FIG. 4.

Referring now to FIGS. 1 and 3 for a description of the elevator 51, it will be noted that the elevator is in the operative position in FIG. 3 and a final storage position in FIG. 1. The elevator 51 comprises two sections, a load delivery arm 52 and a short arm 53. The short arm is relatively rotatable with respect to the delivery arm 52 from a substantially linear position as shown in FIG. 3 to a substantially perpendicular position as shown in FIG. 1. While in operation the short arm 53 is kept from running into the ground by legs 54 at the ends of which are secured disc feet 55. Forward of short arm 53 is found a right bale guide 56 and a left bale guide 57 the purpose of which is to guide or direct or adjust the positions of the bales while they lie on the ground so that they are properly engaged by the endless chain 58 of the short arm 53. Located on the endless chain 58 are transverse ribs 59 whose purpose is to better engage or secure the bale. The elevator drive shaft 60 is driven by a reversible motor 61 which is associated with the hydraulic reservoir and pump system 32. Gears 62 and 63, mounted on the elevator drive shaft 60, provide the driving force for endless chains 58 and 64 (FIG. 4). A short arm hydraulic jack 65 is secured to the lower side of delivery arm 52 by pivot 66. The piston member of jack 65 is pivotally connected to cross-bar 67 which is secured at its ends to side plates 68. Side plates 68 are welded to arms 68a which are rotatably mounted on shaft 60 by ears 68b. Side plates 68 also rotate on shaft 60 better shown in FIG. 4. Said side plates 68 extend forward and are located under lip 69 of the lower side of short arm 53. The forward ends of arms 68a provide a supporting force for short arm 53 by abutting the undersurface of plate 53a. The lower side of short arm 53 has a flange with holes 70 adapted to receive the pin 71 of an upper guide plate 72. Plate 72 is made of sheet steel and has a top flange running the length thereof. Guide plate 72 has two triangular sections 73 and 74, said sections being mounted at an angle, the vertex of which is shown at 75 in FIG. 4. The purpose of guide plates 72 is to prevent the bales engaged by the elevator from falling outside the control of short arm 53. The lower sides of short arm 53 terminate in a hinge member 75 which associates with a meshing portion 76 of the forwardly extending guide member 56. Said guide member 56 has a hollow square shape in cross section. Hole 77 found at the top of guide 56 is adapted to receive pin 78 of section 74 of guide plate 72. Since guide plate 72 is of rigid construction guide member 56 is prevented from rotation about hinge 75 and 76. The openings of hinge 75 and 76 are aligned with hole 79 which is substantially located in the top flange at the juncture of sections 74 and 73. Extending through said hole 79 and hinge 75 and 76 is found a U-shaped tubular frame member 80 which has vertical leg members 81 and a horizontal connecting member 82. The right leg 81 may be welded to the guide plate 72 to afford easy assembly and disassembly of the components. The length of leg members 81 is less than the height of a bale standing on end. Rotatably located at the center of horizontal bar 82 is found a horizontally disposed tilting bar 83. The function of U-shaped member 80 and tilting bar 83 is to engage bales standing on end and cause them to fall to the ground so that they then may be guided by members 56 and 57 onto the short arm section 53 as the entire elevator assembly moves forward.

Figure 5:
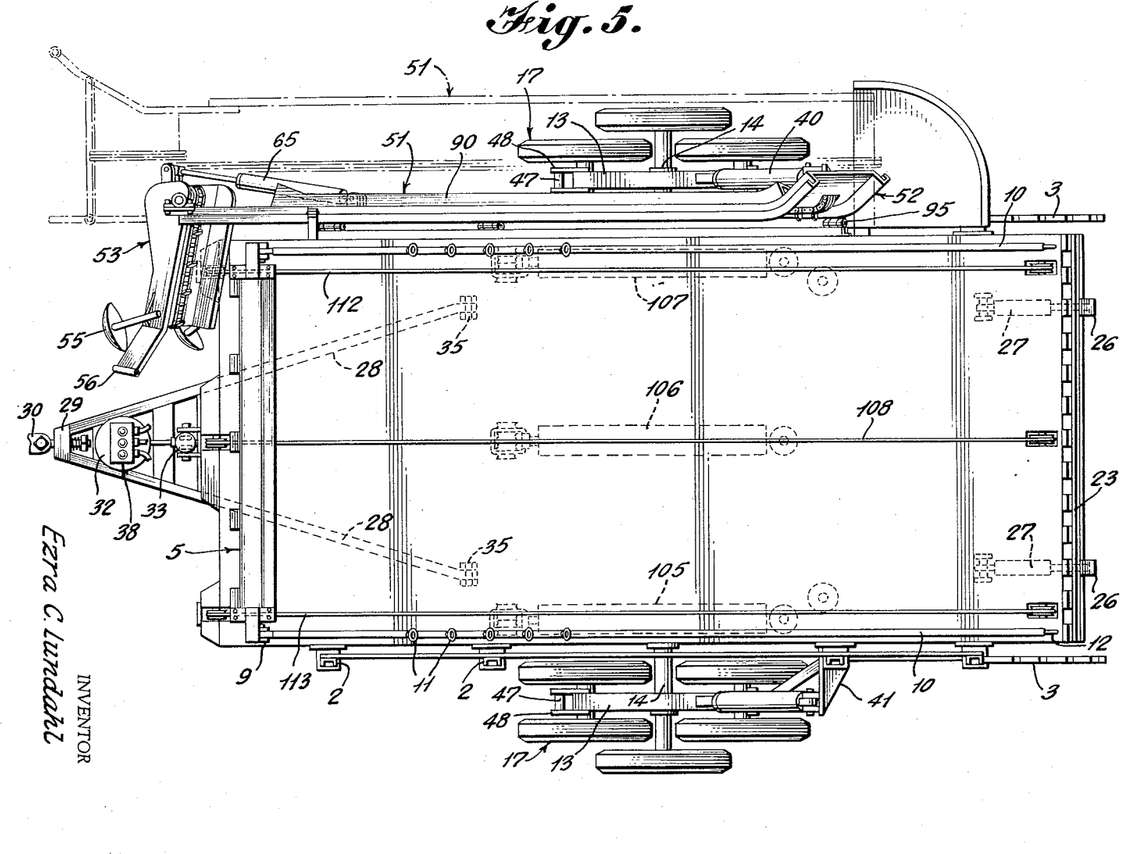
FIG. 5 is a plan view of FIG. 1.

A trough-like member 90 is located along substantially the entire length of delivery arm 52 (as better shown in FIG. 5). A chain guide and support 91 is found in the vertex of the trough 90. A pair of runners 92 and 93 disposed on either side of endless chain 64 are secured to the top portion top surface of delivery arm 52 for the purpose of reducing friction between a moving bale and a top surface of delivery arm 52. Rollers 60a and 60b are mounted on shaft 60 to provide for a smooth transition for the movement of the bale from the short arm 53 to delivery arm 52.

Pivot brackets 90 are rigidly secured to various upright members 2 and are adapted to pivotally receive tubular members 95 secured at respective various locations along delivery arm 52. Angle brackets 96 are secured directly under pivot bracket 94 on upright members 2 and associate with V-supports 97. Pivots 94, brackets 96, and V-supports 97 can be welded or otherwise formed as one solid body. The V-supports 97 are adapted to receive blocks 98, said blocks 98 being rigidly secured to the undersides of channel 99 of delivery arm 52.

When rotated to a final storage position, the elevator assembly 51 is therein secured by pin 100 associating with tube 101 and the hole 102 found in the outer guide plate 103 of the load delivery arm 52. Also, tubular frame 80 and guide plate 72 may or may not be removed before the elevator assembly assumes a final storage position depending upon the desires of the operator.

Hydraulic jacks 105, 106 and 107 are secured to the underside of frame 1 and are longitudinally arranged in parallel relationship. Associated with jack 106 is a cable 108 and respective pulley system comprising pulleys 109, 119, 120 and 121, said cable 108 being rigidly secured to the underside of frame 1 by adjusting bolts 110 and 111. Pulleys 109 and 121 are rotatably and stationarily secured to the frame 1 by horizontal pins while pulleys rotate about stationary vertically disposed pins. Pulleys 119 are mounted on a pin which extends through a pulley support 122 which is secured to the end of the piston of jack 106. Associated with jacks 105 and 107 are cables 112 and 113 and a respective crossover pulley system comprising pulleys 114, 123, 124, 125, 126, 127, 128, 129 and 130. The terminals of cable 113 are rigidly secured to frame 1 by adjusting bolts 115 and 116, and the terminal ends of cable 112 are respectively secured to frame 1 by adjusting bolts 117 and 118. Pulleys 123, 124, 127 and 128 are rotatably and stationarily mounted on frame 1 by horizontal pins, while pulleys 125, 126, 134 and 135 are mounted on vertically disposed pins. Pulleys 129 and 130 are mounted on respective supports 131 and 132 which are secured to respective pistons of jacks 105 and 107. Pulleys 144 and 122 are also mounted on vertical pins but are each comprised of two pulley wheels as better seen in FIG. 7. Pulleys 114 and 122 allows the cable crossover from the left side set of pulleys to the right set and, of course, from right to left. The purpose of the crossover arrangement is to assume an equal application of forces on both side of false front 5 and an equal rate of travel for both said sides.

Figure 7:
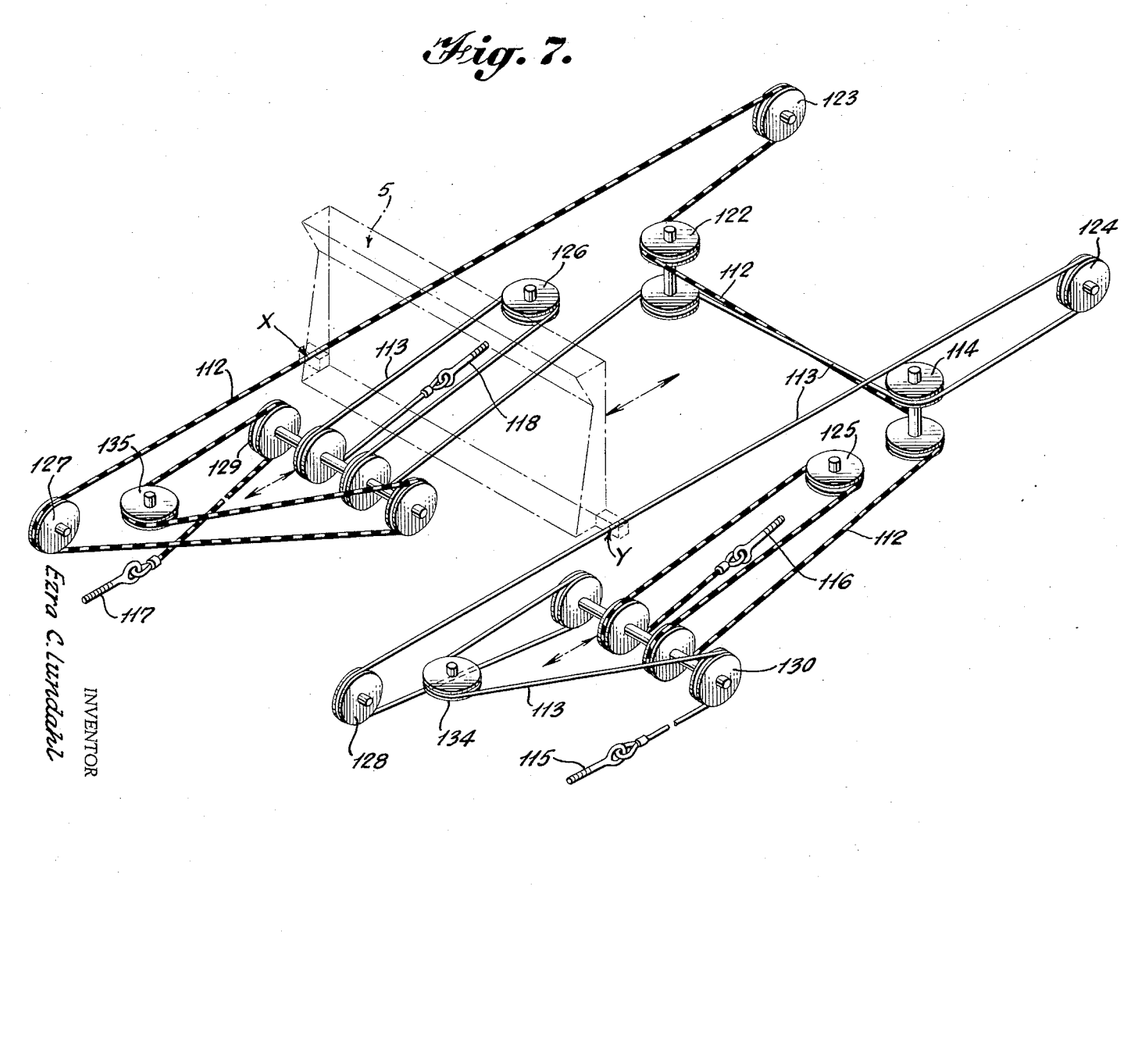
FIG. 7 is a schematic representation of the crossover pulley system.

For the purpose of demonstrating the relative motion of the pistons of jacks 105 and 106 and the false front 5, only the forces found in cable 112 will be discussed, since the forces, movements and locations of cable 113 would be the same or the mirror image thereof. In reference to FIG. 7, it is pointed out that there is shown a mere schematic representation of the pulley and cable system to afford a clearer understanding thereof. Referring now to FIGURES 6 and 7, pulley 123 is located at the rear end of the wagon while pulley 127 is found at the front end of frame 1. The portion of cable 112 between said pulleys 123 and 127 lies above and along the top surface of the wagon bed. Point "X" on the cable represents the location of the clamping plate 8 which is rigid with false front 5. When false front 5 is in the position shown in FIG. 1, the pistons of jacks 105 and 106 are fully retracted as shown in FIG. 6 and the portion of cable 112 between pulleys 127, 135, 129 and eye-bolt 117 assumes its longest length. The portion of cable 112 between pulleys 114, 125, 130 and eye-bolt 116, of course, assumes its shortest length. Point X (and hence false front 5) would be drawn substantially close to pulley 127. When it is desired to have false front 5 move across the length of the wagon frame 1, jacks 105 and 107 are actuated and the respective pistons thereof are forceably extended at the same rate. The extending pistons force the pulley units 129 and 130 to the left as seen in FIGS. 6 and 7. It can then be seen that the portion of cable 112 between pulleys 127, 135, 129 and eye-bolt 117 becomes shorter in length while the portion of cable 112 between pulleys 114, 125, 130 and eye-bolt 116 increases in length. Therefore, the equal and opposite forces in cable 112 are transmitted to eye-bolt 116 and the false front 5 at point X, said point X moving to the right toward pulley 123. During this time, point Y is also moved to the right at the same rate as point X because portions of cable 113 disposed between eye-bolts 115 and 118 experience the same increases and decreases in length and hence the same forces as do the respective portions of cable 112.

To cause movement of front 5 in the opposite direction, fluid ist forced through the jacks 105 and 107 in the reverse direction. The pistons of said jacks are drawn in or drawn to the right in FIGURE 6. The forced movement of pulley unit 129, therefore, causes the portion of cable 112 between eye-bolt 117 and pulley 127 to be increased in length and the portion of cable 112 between eye-bolt 116 and pulley 114 to be decreased in length. Hence, it can be seen, point X on cable 112 moves to the left toward pulley 127. The force on front 5 is transferred from point X, through the portion of cable 112 to eye-bolt 117, to frame 1. Points X and Y on respective cables 112 and 113 will move to the left at the same rate for the reasons set forth above.

Among the many features of the crossover pulley system as described above are (1) great multiplication of mechanical forces can be obtained due to the great number of lines between the eye-bolts and the load, false front 5, (2) the large linear cable displacement, usually a burden in most systems, is used as to a necessary advantage so that the false front 5 can traverse substantially the entire length of the wagon, (3) the novel arrangement of vertical and horizontal pulley axis of rotation provide for optimum space utilization so that critical areas of the underside of frame 1 are not obstructed.

Figures 8, 10A:
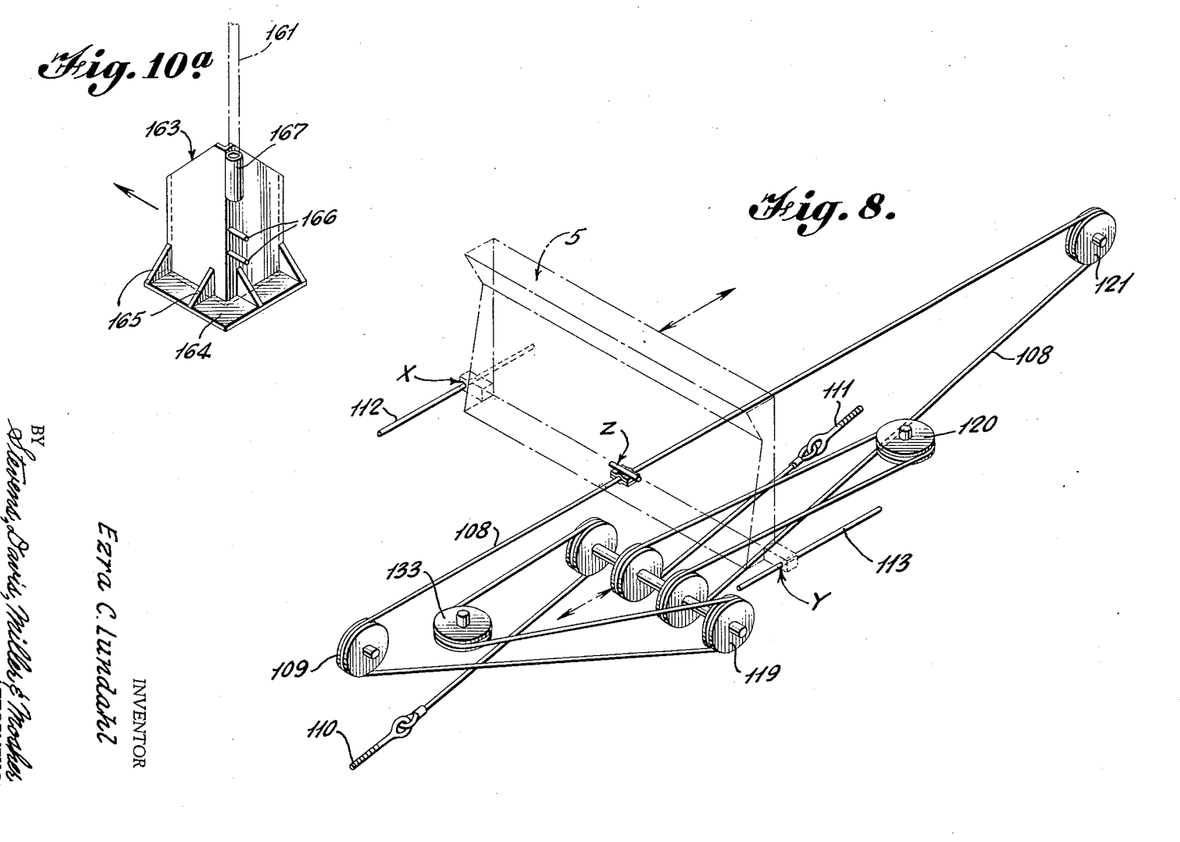
FIG. 8 is a schematic representation of the independent pulley system.

The cable and pulley system associated with jack 106 and shown in FIG. 8 operates completely independently of the crossover pulley and cable system associated with jacks 105 and 107. However, point Z (the point on cable 108 at which the false front 5 is clamped) will move in the same directions and at the same speeds as points X and Y on cables 112 and 113 respectively, because the jacks 105, 106 and 107 are all controlled by the same hydraulic feed and return lines to insure the same rates of movement of the pistons of said jacks. The description of operation of the pulley and cable system is found in the Patent No. 3,003,780 of which this application has a common assignee and the same inventor.

When it is desired to draw a load of stacked bales onto the frame 1, angle plates 163, cable 162, vertical bar 161 and chain 160 are used in conjunction with rods 10. (See FIGS. 10 and 10a.) Angle plate 163 has two side plate members joined at 90 degrees to afford a snug fit at the lower rear corner of a stack. Secured or welded to the bottom thereof is a horizontal plate 164 and supporting struts 165. Pin 166 is provided to prevent upward movement of chain 160 (see FIG. 10). Socket 167 is welded to the angle plate 163 and is adapted to support bar 161 in a vertical position. Cable 162 is supported at the rear end of the stack by fingers 168 of bar 161. Chain 12 is any conventional chain.

The operation of the wagon and the stacking elevator will now be described. Any conventional tractor (not shown) is attached to the hitching means 30 and the power take-off thereof mechanically connected to provide power to shaft 31. Said mechanical connection being any conventional one, such as a series of rods and universal joints. Pin 100 is temporarily withdrawn from socket 101 to allow the elevator to be manually rotated substantially 90 degrees about pivots 95. The delivery arm 52 is supported in an operating position by V supports 97 which provide a supporting force to block 98. After power is supplied to the hydraulic pump system 32, the proper lever 38 can be actuated to operate short arm jack 65, thus retracting the piston of said jack 65 to rotate short arm 53 until it assumes a linear operating position with delivery arm 52 as shown in FIG. 3. Guide plates 72, right guide 56 and tubular frame member 80 are then fitted into position. The proper lever 38 is then thrown in the forward direction by the operator and reversible motor 61 begins driving endless chains 58 and 64 in a direction that lifts engaged bales up elevator 51.

The tractor then pulls the wagon around the filed at the command of the operator. Bales engaged by the elevator are turned, guided, or manipulated into the control of the chain 58 regardless of the position of the bale or the direction of approach of the elevator. Tilting bar 83 engages the bales standing on end and forces them to a horizontal or prone position. As the bale is gripped by the ribs 59 of chain 58, disc feet 55 prevent the lower end of short arm 53 from engaging the ground and provide a substantially frictionless surface on which legs 54 can ride. The bales are carried by chain 58 up the short arm 53 across rollers 60a and 60b onto chain 64 and runners 92 and 93.

When the first layers of bales are being stacked on frame 1, a person in the wagon removes the bales from delivery arm 52 at a point between the two forwardmost upright members 2. (For this purpose there are no lateral slats between said first two upright members on the side of the wagon supporting the elevator, but the absence of these slats cannot be seen in FIG. 1.) When the top layers of bales are being stacked, the bales are removed near the extreme upper end of delivery arm 52.

Assume now that one or two layers have been stacked on frame 1 and there are several bales on delivery arm 52. The reversible motor 61 can be stopped, and jack 65 can be operated to rotate short arm 53 to the dotted position shown in FIG. 3. False front 5 can be driven to the right as seen in FIG. 1 to squeeze or compress the layers of bales on the wagon bed against the tailgate 23. Short arm 53 prevents the bales on the delivery arm 52 from being shaken off said delivery arm 52 by the vibrations imparted to the wagon by the movement of front 5. False front 5 can then be driven to its original position and motor 61 driven to move the bales downward so that a person can then stack another row or two of bales on the wagon bed. Short arm 53 is then rotated to its operating position and the gathering operation resumed.

Figure 9:
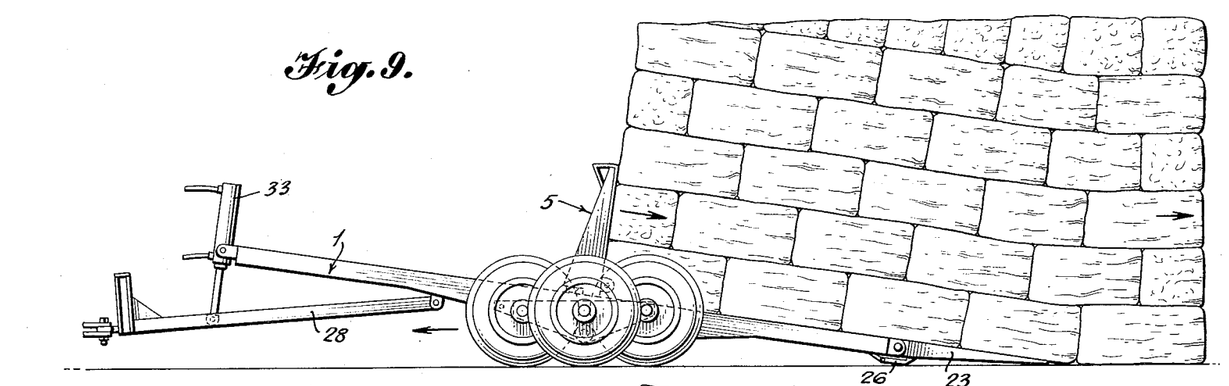
FIG. 9 shows the operation of the wagon in unloading a stack of bale-like objects.

After the bale-like objects are completely stacked and frame 1 is loaded to its capacity, the load is transported to a storage area. The unloading operation takes place as follows: front end jack 33 is actuated to raise the front end of frame 1. (Note particularly FIG. 9.) The pivots 34 and 35 securing the piston of jack 33 and the underside of frame 1 to the converging arms 28 allow for free rotation between the converging arm 28, the frame 1, and the piston of jack 33. At this time, the handbrake of the tractor is released and its gear system put in neutral. Tailgate 23 is rotated to assume a linear position with frame 1. False front 5 is then driven rearwardly or to the right as seen in FIG. 9 and thus pushes or forces the load across frame 1, across tailgate 23, on to the surface of the storage area. When sufficient load is resting on the surface of the storage area, the forces applied to false front 5 will cause the tractor and the wagon assembly to move from under the remaining load or to the left as seen in FIG. 9. To push the load free of tailgate 23, it may be necessary to retract false front 5, rotate false front 5 to a horizontal position, as shown in FIG. 1b, and ram or push the remainder of the load free or past tailgate 23.

Figure 10:
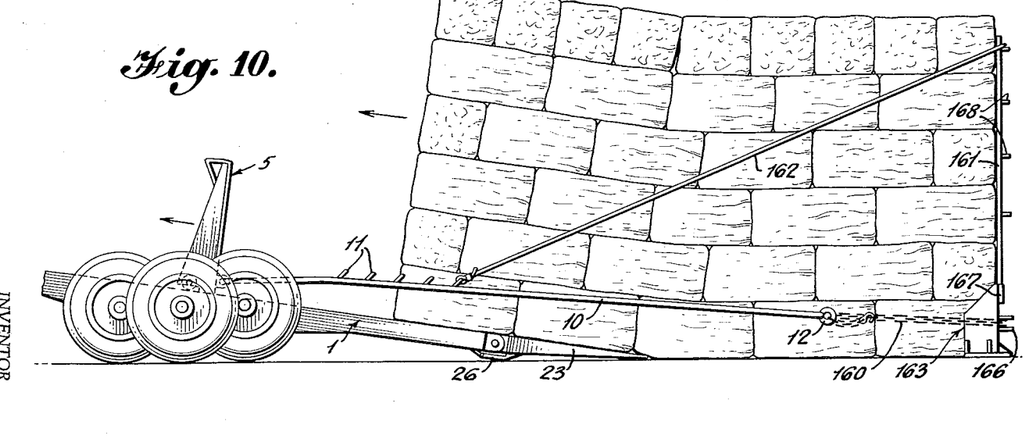
FIG. 10 shows the operation of the wagon in loading a stack of bale-like objects, and FIGS. 11 and 12 demonstrate the method of transferring a load from the wagon to a semi-trailer truck.

The operation of loading a stack of bale-like objects onto the frame 1 of the wagon will now be described. Tailgate 23 is rotated to assume a linear position with frame 1. Front end jack 33 is then operated to raise the front end of frame 1 and lower tailgate 23 to a ground contacting position. The conventional tractor (not shown) is then backed up until tailgate 23 is wedged under the front end of the stack. Note particularly FIG. 10. Tailgate 23 is driven as far under the stack as possible. False front 5 then assumes the position as shown in FIG. 10, and corner plates 163 are fitted into place supporting vertical bars 161. Cable 162 secured by rings 11 and supported by bars 161 provide side support for the stack of bale-like objects. Chain 160 is then secured in place and its ends terminated through end rings 12. With tractor gears in neutral position, false front 5 is driven toward the forward end of frame 1 and said false front 5 imparts a pulling force to rod 10. Hence the load is drawn on to wagon frame 1 by the forces imparted to rod 10, chain 160, and cable 162. When the rear end of the stack is fully seated on tailgate 23, front end jack 33 can be actuated to level out the wagon frame 1. False front 5 can then be moved to the right or towards the load and cable 162 secured to the forwardmost ring 11. False front 5 can then be driven once again to the left to seat the load more fully on frame 1.

Angle plates 163, chains 160, vertical bars 161 and cable 162 can now be removed. If a small portion of the load remains on tailgate 23, tailgate 23 can be rotated to a vertical position to urge the load to be fully seated on frame 1.

If the loading operation is to take place in the wintertime, chances are the entire stack will be frozen in one solid block and the bottom layers of bales frozen to the ground. If this is the case, tailgate 23 and frame 1 can be driven partially under the entire stack, substantially as shown in FIG. 10, and front end jack 33 actuated so that tailgate 23 and frame 1 are used as a lever, the fulcrum of which is the wheel assembly, to break the stack loose from the ground.

Figure 11:
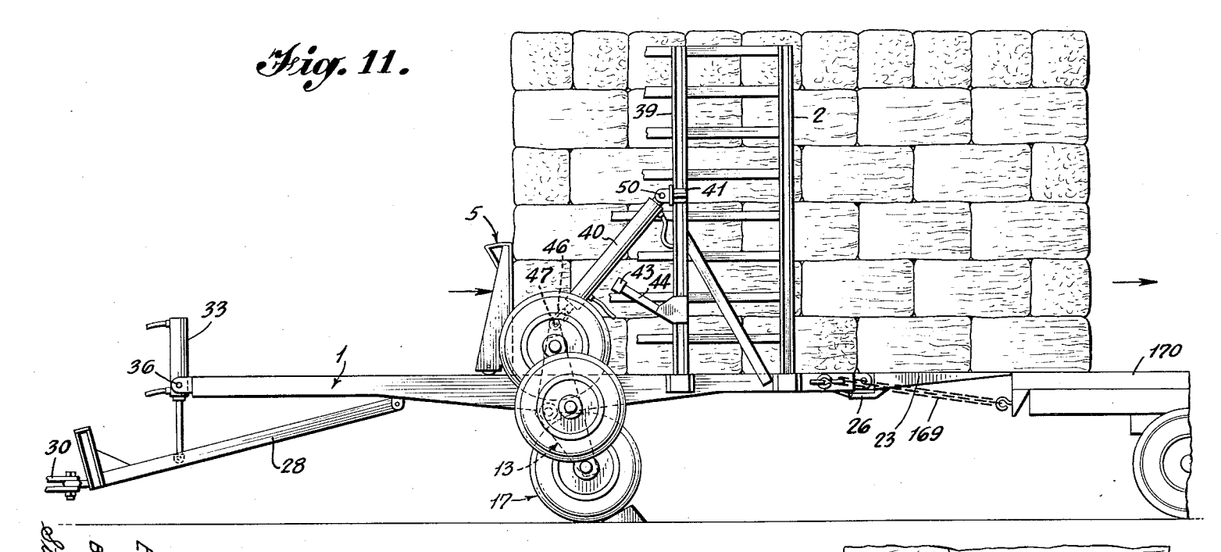
Figure 12:
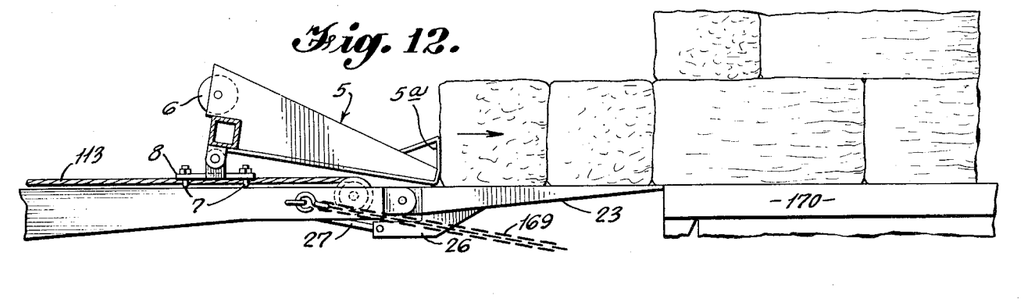

The operation of transferring a load from the wagon to a semi-trailer type vehicle will now be described. The wagon and the semi-trailer truck are back together end to end. The proper distance between the rear ends of the wagon and semi-trailer is maintained by chain 169. The wheel assembly is rotated from a substantially horizontal position to a substantially vertical position by forces applied to triangular member 13 by the "C" hook 46 of wheel assembly jack 40. (See FIG. 11.) The wheel assembly is rotated until the height of the frame 1 is substantially equal to that of the semi-trailer. Tailgate 23 is rotated until it engages the rear end of the semi-trailer. At this time false front 5 is moved rearwardly forcing the load across frame 1, across tailgate 23, onto the bed of the semi-trailer. Movement between the wagon and semi-trailer is prevented by chain 169.

False front 5 is moved to its rearmost position, retracted and moved toward the front end of the wagon, and then rotated downwardly to a horizontal position, and again moved rearwardly to force or ram the load passed the tailgate 23 onto the bed of the tractor trailer. If it is necessary, several bales of hay may be placed between the false front 5 and the load when false front 5 is in its horizontal position in order to force the load more onto tractor trailer 170.

When the load is fully seated on tractor trailer 170, false front 5 is returned to its forward upright position, tailgate 23 is rotated to its vertical position, chain 169 is disengaged, and wheel assembly jack 40 is actuated to rotate the wheel assembly to its initial horizontal position. At this point, the entire process may be repeated, and the second load being transferred on to the tractor trailer 170 forcing the first load resting on tractor trailer 170 to the forward end of said tractor trailer.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A wagon for stacking, loading, and unloading bale-like objects comprising a wagon frame, upright members mounted on said frame, elevator means rotatably secured to said upright members, and securing means for securing said elevator in a stored position, a movable false front and drive means for moving said false front longitudinally on said wagon frame, said drive means comprising a crossover pulley and cable system, said wagon further comprising a tailgate and drive means for rotating said tailgate with respect to said wagon frame, jack means mounted at the forward end of said frame for selectively applying a vertical upward or downward force to the front end of said frame, and drive means for driving said jack means, wheel assembly means and wheel assembly jack means, said wheel assembly jack means being adapted to selectively rotate said wheel assembly means to effect adjustment of the height of said frame above the ground, and drive means for driving said wheel assembly jack means.

2. A wagon as set forth in claim 1, further comprising at least one elongated rod connected to said movable false front and adapted to be used with chain members and corner plates for pulling a load onto said frame, at least one angle plate having two plate sections disposed at substantially 90° and a horizontally disposed pin secured to one of the sections, at least one vertically disposed bar member supported by said angle plate, chain means attached to said elongated rod and coacting with said angle plate, and cable means supported by said bar member and connected to said elongated rod.

3. In combination with a wagon as claimed in claim 2, substitute wheel assembly means adapted to be mounted outside or inside the periphery of the wagon for selectively changing the overall width of the wagon.

4. A wagon as claimed in claim 1, said wagon further comprising means rotatably mounted under the forward end of said frame for allowing said frame to rotate about a horizontal transverse axis.

5. A wagon for stacking, loading, and unloading bale-like objects comprising a wagon bed; wheel assemblies mounted on said bed for movably supporting the same; an upstanding false front member normally positioned at the forward end of said bed and adapted to move throughout at least a major portion of the length of said bed; drive means for moving said false front comprising a first and second piston-cylinder arrangement mounted longitudinally on the underside of said bed; a first and second set of pulleys mounted on said first and second pistons, respectively; a crossover pulley arrangement mounted beneath said bed and longitudinally spaced in one direction from each of said first and second sets of pulleys; first and second pulleys longitudinally aligned and spaced in an opposite direction from said first and second sets of pulleys, respectively; a first cable having one end secured to said bed forward of said first set of pulleys and having a second end secured to said bed rearward of said second set of pulleys; said first cable extending from said one end around said first set of pulleys, around said first pulley, around said crossover pulley arrangement, around said second pulley set, to said second end; a second cable having one end rigidly secured to said bed forward said second set of pulleys and the other end rigidly secured to said bed rearward of said first set of pulleys; said second cable extending from said one end around said second set of pulleys, around said second pulley, around said crossover pulley arrangement, around said first set of pulleys, to said other end; securing members for rigidly securing opposite sides of said false front to the portion of each said first and second cables which is positioned between said forward pulley and crossover pulley arrangement and said second pulley and said crossover pulley arrangement, respectively.

6. A wagon as set forth in claim 5, wherein said first and second cylinders and first and second sets of pulleys are transversely aligned.

7. A wagon as set forth in claim 5, wherein said false front extends transversely across said bed, said false front further comprising a movable base member and an upper portion hingedly secured to said base member so that said upper portion is adapted to be rotated between vertical and horizontal operating positions.

8. A wagon for transferring, loading, and unloading a stack of bale-like objects and the like comprising an elongated, flat loading bed, a wheel assembly rotatably mounted on either side of said bed for movably supporting the same, each wheel assembly comprising an elongated plate rotatably secured to the side of said bed, whereby rotation of said plate results in a raising and lowering of said bed above the normal wheel hub level, a pusher member movably supported on said bed for pushing or pulling the stack of bale-like objects, a pulley and drive system located beneath said bed for moving said pusher member, wheel assembly jacks mounted on said wagon for rotating each elongated plate and wheel assembly thereon, and a forward jack mounted on said wagon bed for rotating said bed about said wheel assemblies, whereby selective operation of said front jack can maintain said bed in a horizontal plane regardless of the vertical position thereof due to the selective operation of said wheel assembly jacks.

9. A wagon as set forth in claim 8, further comprising a rotatable tailgate rotatably mounted on the rear of said bed, and wherein said pusher member comprises a movable base and an upper portion hingedly secured to said base to enable rotation between vertical and horizontal operating positions, whereby the load of bale-like objects is forced rearward of the extremity of said tailgate when in the horizontal position when the pusher member is moved rearwardly in a horizontal position.

10. A wagon as set forth in claim 9, further comprising alignment members mounted at the rear of said bed for maintaining alignment between said wagon and the vehicle upon which the load is to be transferred or from which the load is transferred.

11. A wagon as set forth in claim 8, wherein said wheel assembly is normally located outside the periphery of said bed and wherein at least one wheel of each assembly is removable from said elongated plate, and said plate being mountable inside the periphery beneath said bed so that the over-all width of the wagon can be selectively changed.

12. A wagon for stacking, loading, and unloading bale-like objects comprising, a wagon frame, upright members mounted on said frame, elevator means rotatably secured to said upright members, said elevator means comprising a short arm and a delivery arm, in means for rotating said short arm with respect to said delivery arm, a movable false front adapted to be driven across the length of said frame, drive means for moving said false front comprising a crossover pulley and cable system, a tailgate mounted at the rear of said frame and adapted to be rotated with respect to said frame, jack means mounted at the forward end of said frame for selectively applying a vertical upward or downward force to the front end of said frame, wheel assembly means and wheel assembly jack means, said wheel assembly jack means being adapted to selectively rotate said wheel assembly to effect adjustment of the height of said frame above the ground, supporting rod means rotatably mounted under the forward end of said frame for allowing said frame to rotate about said wheel assembly means, at least one elongated rod connected to said movable false front and adapted to be used with chain members and corner plates for pulling a load onto said frame, substitute wheel assembly means adapted to be mounted inside the periphery of the wagon for selectively changing the overall width of the wagon, and selectively operated fluid pump and reservoir means for driving said elevator means, rotating said short arm with respect to said delivery arm, moving said false front by driving said crossover pulley and cable system, rotating said tailgate, driving said jack means mounted at the forward end of said frame, and driving said wheel assembly jack means.

References Cited by the Examiner
UNITED STATES PATENTS

| | | | |
|---|---|---|---|
| 2,045,566 | 6/1936 | Berg | 214—38.20 |
| 2,140,974 | 12/1938 | Wagner et al. | 214—83.22 |
| 2,490,212 | 12/1949 | Davis | 214—509 X |
| 2,523,916 | 9/1950 | Parement | 214—82 |
| 2,615,586 | 10/1952 | Miller et al. | 214—522 |
| 2,678,234 | 5/1954 | Mazza | 214—505 X |
| 2,748,965 | 6/1956 | Grey | 214—505 |
| 2,756,885 | 7/1956 | Ackermann | 214—514 |
| 3,003,780 | 10/1961 | Lundahl | 214—505 X |
| 3,092,273 | 6/1963 | Schramm | 214—506 X |

GERALD M. FORLENZA, *Primary Examiner.*